(Model.)

I. H. & S. REINER.
Sulky Harrow.

No. 243,621. Patented June 28, 1881.

WITNESSES:
D. A. Twitchell
C. Sedgwick

INVENTOR:
I. H. Reiner
S. Reiner
BY
ATTORNEYS.

UNITED STATES PATENT OFFICE.

ISAIAH H. REINER AND SAMUEL REINER, OF LINE LEXINGTON, PA.

SULKY-HARROW.

SPECIFICATION forming part of Letters Patent No. 243,621, dated June 28, 1881.

Application filed October 23, 1880. (Model.)

*To all whom it may concern:*

Be it known that we, ISAIAH H. REINER and SAMUEL REINER, of Line Lexington, in the county of Montgomery and State of Pennsylvania, have invented a new and useful Improvement in Sulky-Harrows and Corn-Markers, of which the following is a specification.

The invention consists in improving the mechanism for manipulating a harrow, as hereinafter described.

Figure 1:
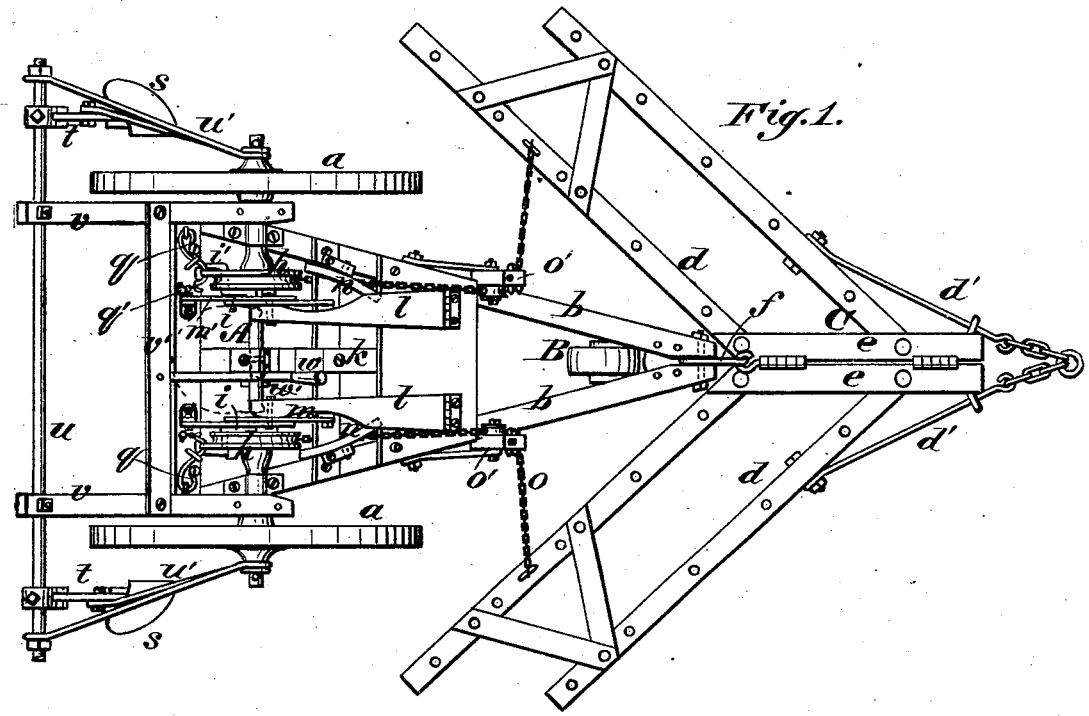
Figure 2:
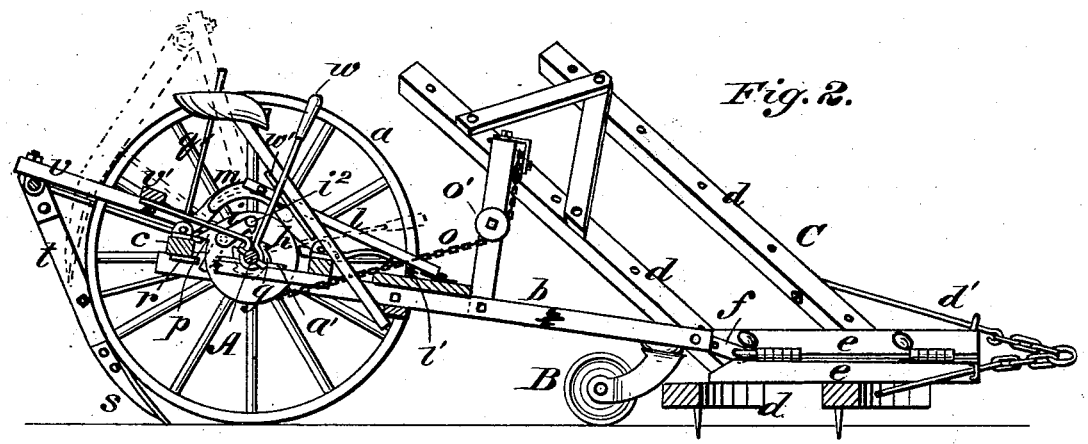
Figure 3:
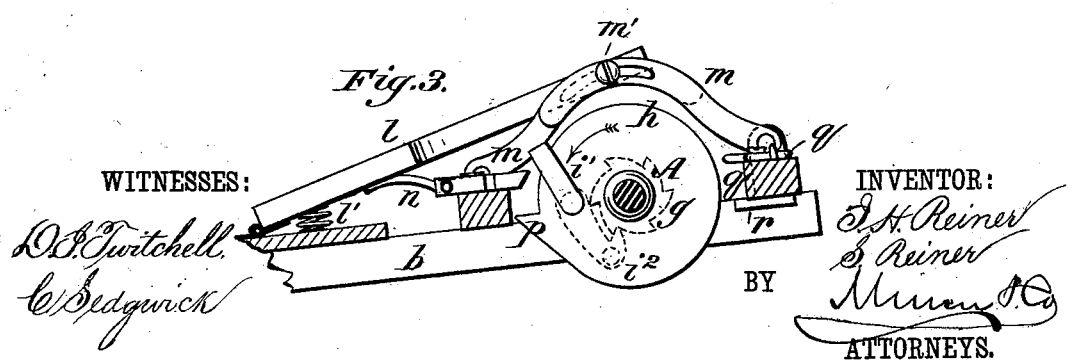

In the drawings, Figure 1 is a plan view of our improved machine. Fig. 2 is a vertical longitudinal section of the same, showing one side of the harrow in a raised position; and Fig. 3 is a detail view, showing the tripping and locking mechanism.

Similar letters of reference indicate corresponding parts.

A is the axle of the sulky, carrying the main supporting-wheels $a\ a$, and on which is secured a triangular frame, consisting of diagonal side reaches, $b\ b$, rear cross-bar, $c$, and other cross-bars, as required, to support the parts. The wheels are fast on the axle, and the axle is divided at its mid-length, the ends being held in a box, $a'$, so that the wheels may turn independently of each other. The forward end of the sulky-frame is fitted with a caster-wheel, B, which supports that end of the frame.

C is the harrow, consisting of inclined bars $d$, extending from bars $e$, that are hinged together, so that either or both of the inclined sides of the harrow can be swung upward.

To the forward portion of the harrow draft-bars $d'$ are connected, and the sulky is connected to the harrow by a link, $f$, that extends from between the reaches $b\ b$ to an eye or hook on the pin of the back hinge of bars $e$. This link $f$ permits vertical movement of the harrow independently of the sulky-frame, and is connected between the reaches $b\ b$ by a cross-pin passing through one of a number of holes in the link, so that the connection can be lengthened as desired.

The mechanism for manipulating the harrow is constructed and operated as follows:

The devices are the same in connection with each portion of the divided axle and each side of the harrow, and the description applies to either.

Upon the axle A is fixed a ratchet-wheel, $g$, next to which is a loose pulley or drum, $h$, having a grooved periphery.

On the side of pulley $h$ is hung a dog or pawl, $i$, the pivot of which is fitted at the side of the pulley opposite to the pawl, with an arm, $i'$, long enough to project beyond the periphery of the pulley. The pawl $i$ is provided with a side lug or projection, $i^2$.

Upon the sulky-frame, at one side of seat-standard $k$, is hinged a foot-lever, $l$, thrown upward by a spring, $l'$, and connected at its outer end with a toggle bar or bars, $m$, that are pivoted on cross-bars of the sulky-frame. The moving ends of bars $m$ are slotted, and the connection to lever $l$ is made by a pin or screw, $m'$, passing through the slots. There is also hung on the frame a lever-pawl, $n$, one end of which extends beneath lever $l$, while the other end terminates near the face of pulley $h$ in the path of the arm $i'$.

From the periphery of pulley $h$ a chain, $o$, passes over friction-pulleys $o'$, sustained on a standard, to the harrow, the end of the chain being connected to one bar, $d$, near the rear end. The pulley $h$ is provided with one inclined tooth or lug, $p$, for engagement with a spring-catch, $q$, that is fitted on the rear cross-bar of the machine, and on said cross-bar a hand-lever, $q'$, is fitted, in connection with the spring-catch, for pressing the catch back to relieve the lug $p$.

In operation, if it is desired to raise one side of the harrow to clear an obstruction, the operator presses the lever $l$ at that side down. The bars $m$ are thereby moved down with the rear bar in the path of the lug $i^2$ of pawl $i$, so that the pawl is brought into contact with ratchet-wheel $g$ and pulley $h$ carried around with the axle. This winds the chain $o$ and raises the side of the harrow, or by pressing both levers $l$ down both sides of the harrow are raised. The levers being immediately released, the arm $i'$ of the pawl will be moved by contact with the pawl-arm $n$, the pawl thus thrown out of the ratchet-teeth, and the harrow will drop after being raised a short distance; but if the harrow is to be raised fully the lever or levers $l$ will be kept down, which will raise pawl-lever $m$, so that arm $i'$ will clear it, and the pulley will continue to raise the harrow until the tooth $p$ passes above the spring-catch $q$, when, the levers having been released, the arm $i'$ of pawl $i$ comes in contact with a fixed projection, $r$, beneath catch $q$, the wheel $i$ is released from the ratchet-wheel, but is prevented from running back by the catch $q$. The harrow is thus readily manipulated and the draft-power used to raise it.

The markers consist of plows $s$ on the ends of standards $t$, that are hung on a cross-bar, $u$, supported on the outer ends of arms $v\ v$, that are hung on axle A. There is also hung on the axle or frame of the machine a crank-lever, $w$, one end of which extends at the side of the seat, while the other end extends beneath a cross-bar, $v'$, that connects the arms $v$ together, so that the markers can be raised and lowered. The standards $t$ and cross-bar $u$ are braced by rods $w'$, that extend from the outer ends of axle A. The standards $t$ are fitted to slide on bar $u$, so that they may be adjusted toward and from each other, set-screws being provided to clamp the standards as adjusted. The markers, following immediately after the harrow, mark the ground for corn-planting, and this combination saves the subsequent time and labor of separate marking. The sulky-frame being supported by the caster-wheel at its forward end, there is no weight on the horses, as is the case with two-wheeled harrows. The triangular sulky-frame being connected between the sides of the harrow, the latter extends both in front of and at the sides of the sulky, thus making a compact machine and permitting the driver to observe the work.

Having thus fully described our invention, we claim as new and desire to secure by Letters Patent—

1. In sulky-harrows, the ratchet-wheels $g$, loose pulleys $h$, pawls $i$, having arm $i'$, foot-levers $l$, toggle-bars $m$, lever-pawl $n$, and chain $o$, combined together and with the axle and hinged harrow, substantially as shown and described, for operation as set forth.

2. In sulky-harrows, the spring-catches $q$ and fixed projections $r$, combined with the winding-pulleys $h$, provided with tooth $p$, and clutching-pawls $i$, having arms $i'$, substantially as and for the purposes set forth.

ISAIAH HARLEY REINER.
SAMUEL REINER.

Witnesses:
HELEN LEIDY,
ISAIAH LEIDY.